(12) United States Patent
Dolgos

(10) Patent No.: US 10,487,482 B2
(45) Date of Patent: Nov. 26, 2019

(54) ADJUSTABLE TEMPERATURE REGULATED FAUCET

(71) Applicant: Scott E. Dolgos, Bridgeville, PA (US)

(72) Inventor: Scott E. Dolgos, Bridgeville, PA (US)

(*) Notice: Subject to any disclaimer, the term of this patent is extended or adjusted under 35 U.S.C. 154(b) by 162 days.

(21) Appl. No.: 15/633,701

(22) Filed: Jun. 26, 2017

(65) Prior Publication Data

US 2017/0292251 A1 Oct. 12, 2017

Related U.S. Application Data

(62) Division of application No. 14/207,564, filed on Mar. 12, 2014, now Pat. No. 9,732,866.

(60) Provisional application No. 61/780,585, filed on Mar. 13, 2013.

(51) Int. Cl.

| G05D 23/13 | (2006.01) |
|---|---|
| E03C 1/04 | (2006.01) |
| F16K 17/38 | (2006.01) |
| G05D 23/02 | (2006.01) |
| F16K 11/20 | (2006.01) |
| F16K 11/00 | (2006.01) |
| F16K 31/00 | (2006.01) |
| F16K 31/60 | (2006.01) |

(52) U.S. Cl.
CPC ............ *E03C 1/041* (2013.01); *F16K 11/207* (2013.01); *F16K 17/38* (2013.01); *F16K 19/006* (2013.01); *F16K 31/002* (2013.01); *F16K 31/602* (2013.01); *G05D 23/022* (2013.01); *G05D 23/025* (2013.01); *G05D 23/134* (2013.01); *Y10T 137/7737* (2015.04)

(58) Field of Classification Search
CPC ........ E03C 1/041; F16K 17/38; F16K 31/002; G05D 23/022; G05D 23/025; G05D 23/134; G05D 23/1346; G05D 23/1353
See application file for complete search history.

(56) References Cited

U.S. PATENT DOCUMENTS

| 5,141,153 | A | 8/1992 | Jeffress |
| 5,647,530 | A | 7/1997 | Lorch |
| 5,904,291 | A | 5/1999 | Knapp |
| 6,257,493 | B1 | 7/2001 | Chamot et al. |
| 7,392,955 | B1 | 7/2008 | Laing |

(Continued)

FOREIGN PATENT DOCUMENTS

| EP | 1589393 A1 | 10/2005 |
| WO | 03085474 A1 | 10/2003 |

*Primary Examiner* — Jonathan Bradford
(74) *Attorney, Agent, or Firm* — Maginot, Moore & Beck LLP

(57) ABSTRACT

A valve assembly for a faucet assembly includes a housing, a thermal motor and a sealing element. The housing includes a first inlet that receives water from a first source, a spout outlet in fluid connection with the first inlet, and a second inlet that receives water from a second source. The thermal motor is within the housing and imparts linear force in an axial direction. The sealing element is operably coupled to move in response to the imparted linear force, and is configured to engage a seating element to form a seal between the second inlet and the spout outlet. The seating element is disposed axially between the motor and the sealing element, and movement of the sealing element in the axial direction breaks the formed seal to allow fluid flow within the housing between the second inlet and the spout outlet.

20 Claims, 9 Drawing Sheets

(56) References Cited

U.S. PATENT DOCUMENTS

| | | |
|---|---|---|
| 7,487,923 B2 | 2/2009 | Willsford et al. |
| 7,717,351 B2 * | 5/2010 | Kline .................... F16K 15/025 |
| | | 236/12.18 |
| 7,744,007 B2 | 6/2010 | Beagen et al. |
| 8,091,793 B2 | 1/2012 | Kempf et al. |
| 2005/0173545 A1 | 8/2005 | Strader |
| 2009/0078218 A1 | 3/2009 | Gordon et al. |
| 2012/0104107 A1 | 5/2012 | Goncze |
| 2012/0026696 A1 | 10/2012 | Holmes |

* cited by examiner

ADJUSTABLE TEMPERATURE REGULATED FAUCET

This application is a divisional application of U.S. Ser. No. 14/207,564, filed Mar. 12, 2014, which claims the benefit of U.S. Provisional Application Ser. No. 61/780,585, filed Mar. 13, 2013, which is incorporated herein by reference.

FIELD OF THE INVENTION

The present invention relates generally to faucets, and more particularly, to faucets having temperature regulation.

BACKGROUND

Temperature-regulated faucets are used, at least in some cases, to ensure that the water ejected from the faucet does not have a harmfully excessive temperature. Various methods have been used to carry this out, including the use of thermostatic valves that force inclusion of cold water in the ejected water if the water temperature is above a threshold.

Prior designs suffer many drawbacks, including lack of reliability, lack of easy adjustability, and manufacturing cost. For example, at least some building codes require the use of an ASSE 1070 mixing valve to insure outlet temperature never exceeds 110°. Currently, faucets meet this code by the use of an under-the-counter thermostatic mixing valve (TMV). The inherent flaw to this design is that the TMV is under constant pressure and relies on independent spring check valves to prevent a cross connection within the plumbing system. In other words, failure or degradation of the under-the-counter mixing valve can affect the plumbing system, as opposed to merely resulting in poor operation of the faucet.

Furthermore, spring check valves are easily affected by dirt and debris within the waterway and the thermal expansion (caused by heating the water) creates a higher pressure on the hot water lines. This higher pressure has a tendency to creep into the cold lines and create even larger problems to the domestic water system.

Some alternative designs, such as that shown in U.S. Pat. No. 6,257,493 address this issue by implementing a thermal motor and a cold water bypass mixing chamber that are upstream of the on-off features. However, this design is a single handle design unsuitable for heavy duty applications, is not adjustable, and has high relative manufacturing costs.

There is a need, therefore, for a temperature regulated faucet design that addresses one or more of the above-referenced drawbacks.

SUMMARY

The objective of the inventive faucet design disclosed herein is to thermostatically control the outlet temperature of water in the commercial faucet industry and eliminate cross connection associated with current designs. At least some embodiments of the present invention moves a TMV assembly above the on/off features of a two-handled faucet, and employs vertically separated mixing chamber and cold-water bypass, and eliminates the potential for cross connection. The TMV assembly in some embodiments is further configured to selectively seal the cold-water bypass using a seal that seals with the pressure of the cold water in the bypass.

In any event, because the TMV is now located above the hot and cold seats of the faucet, there is no chance of pressurizing the upper faucet body with the spout open to atmosphere. And when the hot and cold seats are closed, no water enters the mixing well.

In one inventive feature, the placement of the mixing well above the hot and cold on/off features allows for the TMV assembly to be placed in a way that it may be readily adjusted. In a preferred embodiment, the adjustment access to the TMV is located under the spout where the spout couples to the frame. In another feature, standard two-handle cartridges are used for on-off of hot and cold water, while a similar or identical cartridge casing is used for the TMV, thereby allowing for ease of manufacture.

A first embodiment is a faucet comprising a mixing chamber, a bypass chamber, a hot water actuator, a cold water actuator, and a valve assembly. The mixing chamber is in fluid communication with a spout. The bypass chamber is operably coupled to a source of cold water. The cold water actuator is operably coupled to provide, upon actuation, cold water to the mixing chamber. The hot water actuator is operably coupled to provide, upon actuation, hot water to the mixing chamber. The valve assembly has a seal configured to move in a direction away from the spout responsive to a temperature of water in the mixing chamber exceeding a threshold, such that fluid connection is provided between the bypass chamber and the mixing chamber.

In another embodiment, a valve assembly includes a housing, a thermal motor and a sealing element. The housing includes a first inlet that receives water from a first source, a spout outlet in fluid connection with the first inlet, and a second inlet that receives water from a second source. The thermal motor is within the housing and imparts linear force in an axial direction. The sealing element is operably coupled to move in response to the imparted linear force, and is configured to engage a seating element to form a seal between the second inlet and the spout outlet. The seating element is disposed axially between the motor and the sealing element, and movement of the sealing element in the axial direction breaks the formed seal to allow fluid flow within the housing between the second inlet and the spout outlet.

The above-described features and advantages, as well as others, will become more readily apparent to those of ordinary skill in the art by reference to the following detailed description and accompanying drawings.

BRIEF DESCRIPTION OF THE DRAWINGS

FIG. 4c shows an exploded view of the TMV assembly of FIG. 4a;

DETAILED DESCRIPTION

Figure 1:
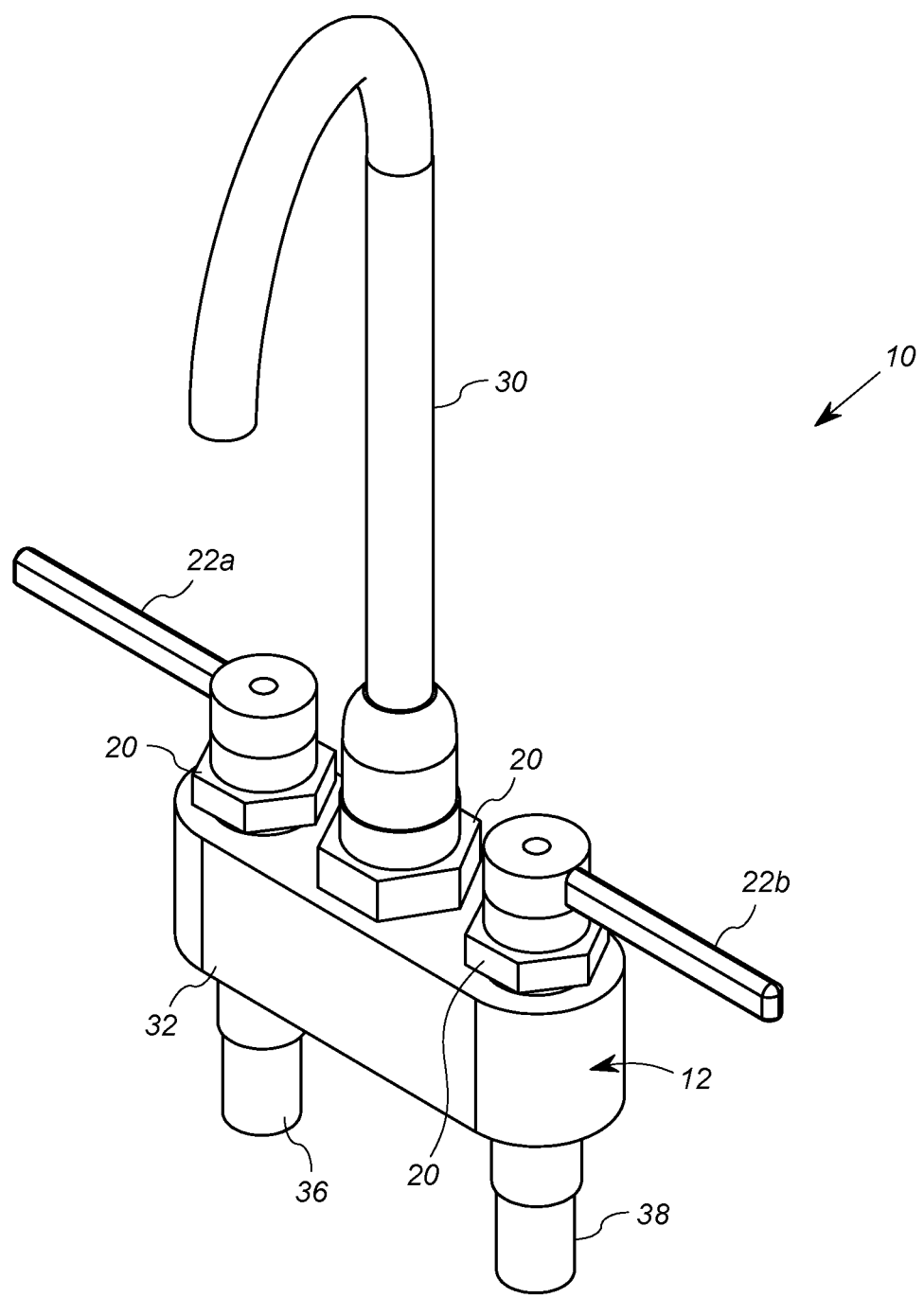
FIG. 1 shows a perspective view of a faucet incorporating an embodiment of the invention.
Figure 2:
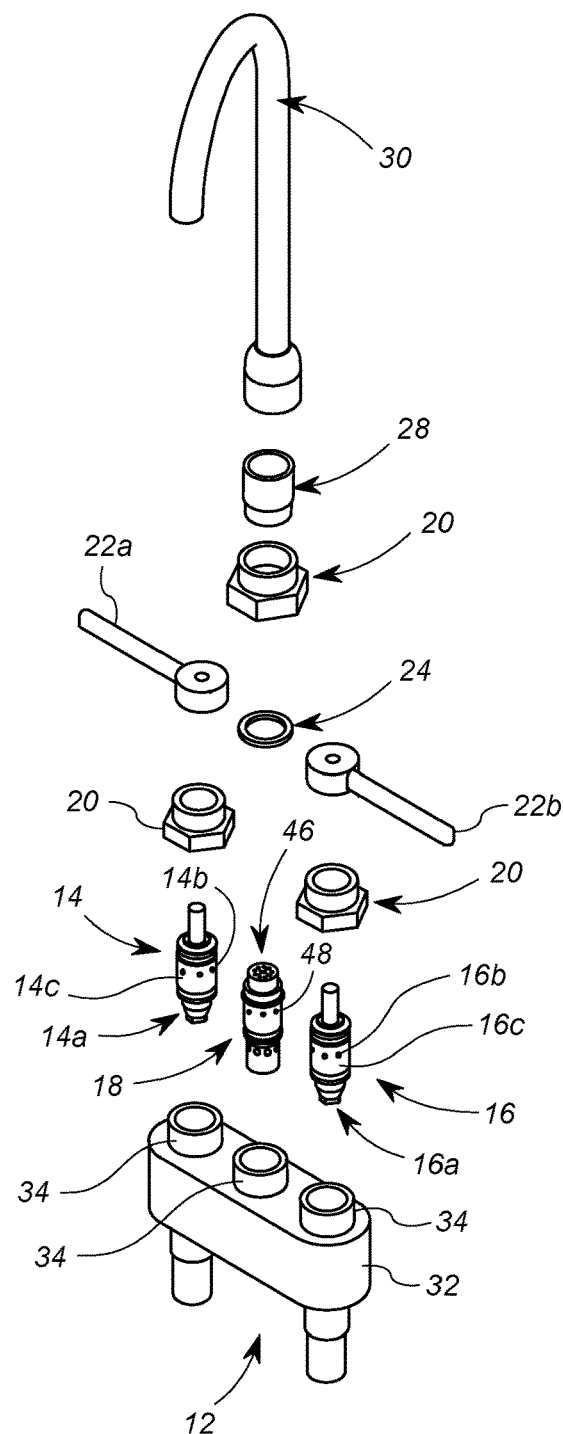
FIG. 2 shows an exploded perspective view of the faucet of FIG. 1.
Figure 3:
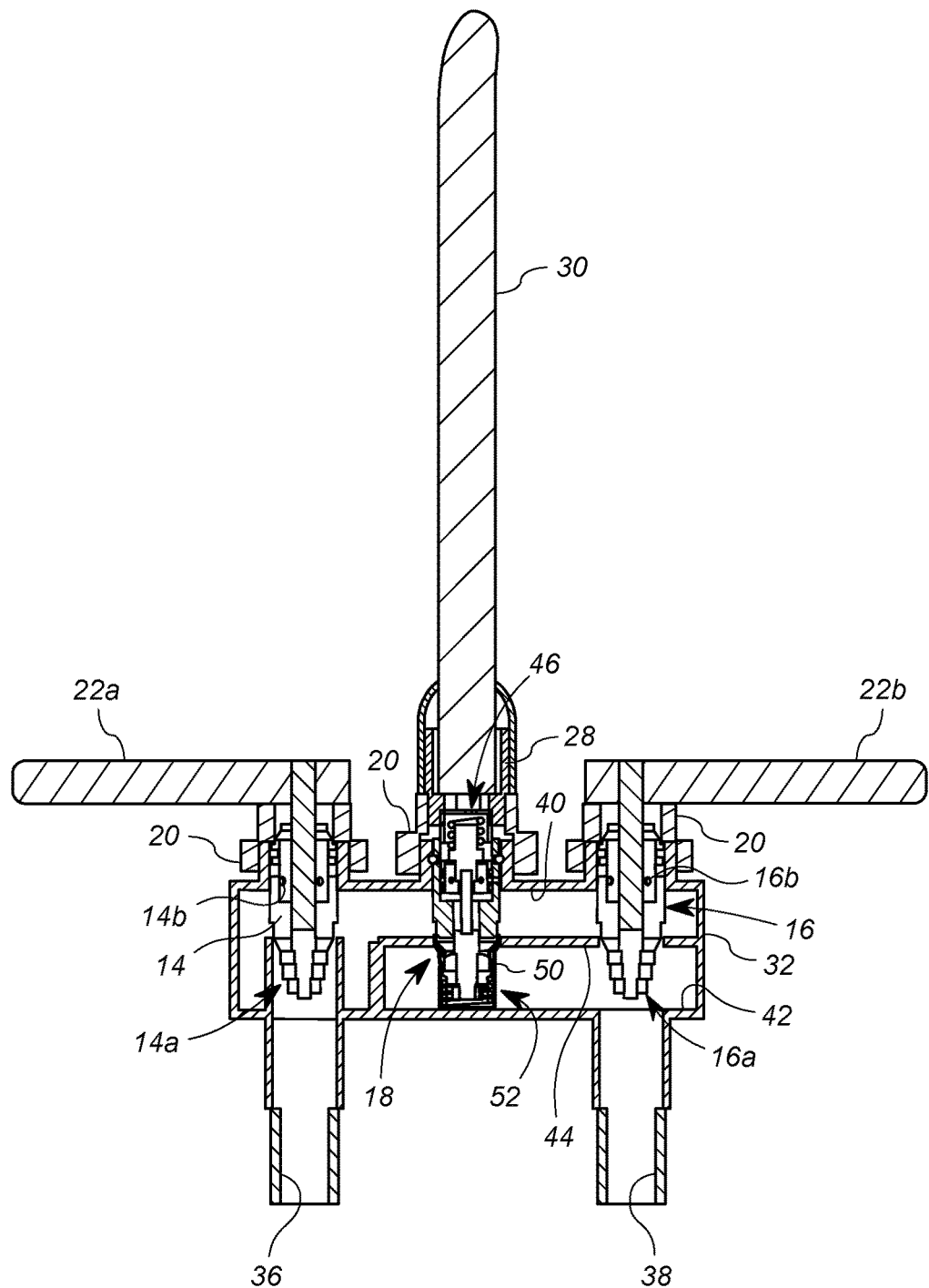
FIG. 3 shows a cutaway view of the faucet of FIG. 1.

FIGS. 1, 2 and 3 show different views of a faucet 10 that incorporates at least one embodiment of the present invention. In the embodiment described herein, the faucet 10 is a two-handle, cartridge style, cast brass design. The faucet 10 includes a faucet body 12, a hot water actuator 14, a cold water actuator 16, a thermostatic mixing valve (TMV) assembly 18, retaining nuts 20, handles 22a and 22b, an O-ring 24, retainer members 26, a bushing holder 28 and a spout 30.

The faucet body 12 in this embodiment includes a brass enclosure 32, three cartridge receptacles 34, a hot water inlet 36, and a cold water inlet 38. As shown in FIG. 3, the faucet body 12 further includes an upper mixing chamber 40 and a lower chamber 42. The mixing chamber 40 in this embodiment is a chamber that is in fluid connection with an outlet of the hot water actuator 14, an outlet of the cold water actuator 16, and an inlet of the TMV assembly 18. As will be discussed below, the bypass chamber 42 is separated from the mixing chamber 40 primarily by a wall 44, and is in fluid connection with the cold water inlet 38.

The hot water actuator 14 in this embodiment is a hot water actuator cartridge that is secured within the left-most cartridge receptacle 34 by a fastener 20. The handle 22a is operably coupled to the hot water actuator 14 to enable manual rotation thereof. In general, the hot water actuator 14 includes an inlet 14a, outlets 14b, and a casing 14c. The casing 14c in this embodiment has a substantially cylindrical outer surface having a predefined diameter. The hot water actuator 14 includes a valve configured to selectively provide fluid connection between its inlet 14a and its outlet 14b, based on the rotational position of the connected handle 22a. As shown in FIGS. 2-3, when the actuator 14 is in place, the inlet 14a is in fluid communication with the hot water inlet 36 and the outlets 14b are in fluid communication with the mixing chamber 40. Thus, the handle 22a may be used to selectively cause hot water to flow from the hot water inlet 36, which is under pressure, to the mixing chamber 40. Hot water cartridges including such features of the hot water actuator 14 are known.

Similarly, the cold water actuator 16 in this embodiment is a cold water actuator cartridge that is secured within the right-most cartridge receptacle 34 by another fastener 20. The handle 22b is operably coupled to the cold water actuator 16 to enable manual rotation thereof. In general, the cold water actuator 16 includes an inlet 16a, outlets 16b, and a casing 16c. The casing 16c in this embodiment has a substantially cylindrical outer surface having the same predefined diameter as the casing 14c. The cold water actuator 16 is a valve configured to selectively provide fluid connection between its inlet 16a and its outlet 16b, based on the rotational position of the handle 22b. As shown in FIGS. 2-3, when the actuator 16 is in place, the inlet 16a is in fluid communication with the cold water inlet 38 and the outlets 16b are in fluid communication with the mixing chamber 40. Thus, the handle 22b may be used to selectively cause cold water to flow from the cold water inlet 38, which is under pressure, to the mixing chamber 40. Such cold water cartridges are known.

The bypass chamber 42 is in fluid connection with the cold water inlet 38. In general, the TMV assembly 18 is disposed in the middle receptacle 34. In that position, the TMV assembly 18 is disposed within the mixing chamber 40 between the bypass chamber 42 and the spout 30. The TMV assembly 18 includes a housing having a spout outlet 46, mixing chamber inlets 48 and a bypass inlet 52. The spout outlet 46 is in fluid connection with and coupled adjacent to the spout 30. The mixing chamber inlets 48 are in fluid connection with the mixing chamber 40. The bypass inlet 52 is in fluid connection with the bypass chamber 42. It will be appreciated that the TMV assembly 18 itself extends through an opening in the wall 44 between the mixing chamber 40 and the bypass chamber 42.

In general, the TMV assembly 18 has three modes. In a first or normal mode, the TMV assembly 18 is configured to provide fluid communication between the mixing chamber 40 and the spout 30, but not with the bypass chamber 42. In the first mode, the water ejected from the spout 30 constitutes a combination of the water that flows through the hot water actuator 14 and the cold water actuator 16. The sealing element 50 is normally "closed", thereby preventing cold water from flowing from the bypass chamber 42. As a consequence, the temperature of the water is complete controlled via selective rotation of the handles 22a, 22b, as in the case of an ordinary faucet.

In a second or bypass mode, the TMV assembly 18 is configured to provide fluid communication between the mixing chamber 40, the bypass chamber 42, and the spout 30. To this end, the TMV assembly 18 includes a valve assembly having a sealing element 50 configured to move in a direction away from the spout 30 (i.e. against the pressure of the cold water in the bypass chamber 42) responsive to a temperature of water in the mixing chamber 40 (i.e. within the TMV assembly 18) exceeding a threshold. The movement of the sealing element 50 away from the spout 30 opens a fluid conduit through interior of the TMV assembly 18 between the bypass inlet 52 (and hence the bypass chamber 42) and the spout outlet 46/mixing chamber inlets 48 (and hence the mixing chamber 40 and/or the spout 30. The cold water under pressure in the bypass chamber 42 thereby enters the interior of the TMV assembly 28 to lower the temperature of the water therein, thus lowering the temperature of the water exiting the spout 30. Thus, if the handles 22a, 22b are positioned such that the temperature of water in the mixing chamber 40 would exceed a predetermined maximum (e.g. 110° F.), then the TMV assembly 18 automatically mixes in additional cold water from the bypass chamber 42.

In the third or shut-down mode, the TMV assembly 18 operates to block the fluid communication to the spout 30 from the mixing chamber 40. Thus, in shut-down mode, the TMV assembly 18 does not allow water from the mixing chamber 40 to enter the spout 30. The TMV assembly 18 is configured to enter the third mode when the cooling water from the bypass chamber 42 cannot sufficiently cool the water provided to the spout 30 below the predetermined maximum temperature.

Thus, the TMV assembly 18 is configured to provide an override or bypass function that automatically adds cold water in the event that the water in the mixing chamber 40 exceeds a predetermined temperature, and further provides a shut-down function when the added cold water cannot adequately cool the water provided to the spout 30 below the predetermined temperature.

It will be appreciated that by employing a sealing element 50 that opens by moving against the pressurized cold water in the bypass chamber 42, the pressurized cold water in the bypass chamber 42 will under normal conditions will be urged toward its sealed position. By contrast, some prior art devices use a seal that moves toward the spout (with the pressured bypass water) to open, and thus must resist the pressure of the bypass cold water source even when the faucet is not in use.

Figure 4A:
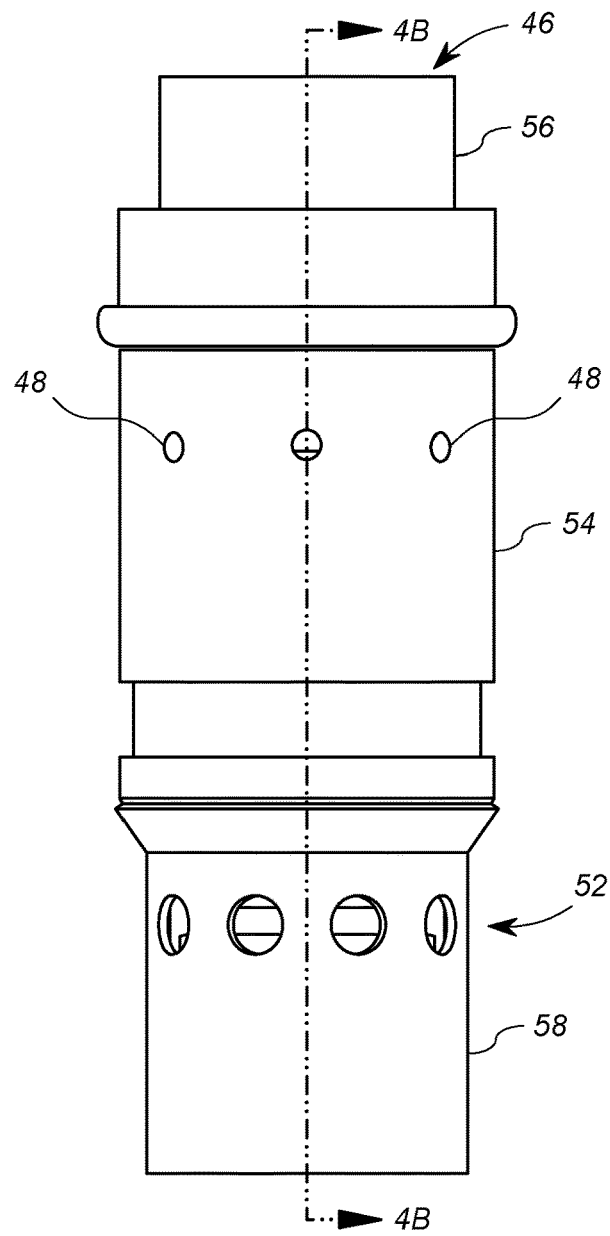
FIG. 4a shows a plan view of a thermostatic mixing valve (TMV) assembly according to at least one embodiment of the invention that may be used in the faucet of FIG. 1.

FIG. 4a shows a more detailed plan view of an exemplary TMV assembly 18 according to an embodiment of the present invention. The TMV assembly 18 includes an external housing that comprises a body 54 coupled to and between a cap 56 and a lower housing 58. The body 54 forms a casing having a cylindrical outer surface with the same diameter as the casings 14c and 16c. Because the casings of the cartridges 14, 16 and the TMV 18 all have the same casing dimensions, the fittings for the various elements may be uniform, thereby simplifying manufacturing, repair and refitting. As shown in FIG. 4a, the lower housing 58 contains the bypass inlet 52, the body 54 includes the mixing chamber inlets 48, and the cap 56 contains the spout outlet 46.

Referring again to FIGS. 2 and 3, as well as FIG. 4a, the lower housing 58 is sized to fit through the opening in the wall 44, such that it resides in the bypass chamber 42. The body 54 resides in the mixing chamber 40. As will be discussed further below, a flared upper rim 98 (see FIG. 4b) of the lower housing 58 forms a tight fit within the opening in the wall 44, thereby ensuring that water from the bypass chamber 42 cannot enter the mixing chamber 40, except through the interior of the TMV assembly 18 when the seal 50 is open (bypass mode). The O-ring washer 24 fits over the cap 56 and the retainer nut 20 is fit over the cap 56 and washer 24, and secures via threads to the outer surface of the center cartridge receptacle 34. The actuator cartridges 14 and 16 are similarly secured within their respective receptacles 34 with similar retainer nuts 20. The handles 22a and 22b are secured the respective cartridges 14, 16 in any conventional way.

The spout 30 is then coupled to the center retainer nut 20 via a threaded bushing 28. As discussed above, all water flowing through the spout 30 must come through the spout outlet 46 of the TMV assembly 18.

In general, when both handles 22a, 22b are in the off position, then no water enters the mixing chamber 40 from either the hot water source or the cold water source (i.e. the plumbing system). The actuator 14 prevents hot water from entering the mixing chamber 40, the actuator 16 prevents cold water from entering the mixing chamber 40, and the TMV assembly 18 (and sealing element 50) prevents water from entering the mixing chamber 40 and spout 30. If the cold water handle 22b is moved to any of a plurality of on-positions, the actuator 16 will allow a corresponding flow of cold water into the mixing chamber 40. The pressurized water will enter the mixing chamber inlets 48 and exit the spout outlet 46 to the spout 30. The spout 30 will thereby deliver cold water.

If the hot water handle 22a is also moved to any on-position, the actuator 14 will allow a corresponding flow of hot water into the mixing chamber 40. The pressurized water will mix with the cold water (assuming the handle 22b is still on) in the mixing chamber 40. The mixed hot and cold water will enter the mixing chamber inlets 48 of the TMV assembly 18 and exit the spout outlet 46 into the spout 30. The spout 30 will thereby deliver a mix of hot and cold water. If the temperature of the water in the mixing chamber 40, and particularly in the interior of the TMV assembly 18, is below the predetermined temperature, the TMV assembly 18 will retain the sealing element 50 such that water from the bypass chamber 42 does pass to spout output 46 or even the mixing chamber 40.

If, however, the temperature of the water in the mixing chamber 40 is above the predetermined temperature, then the TMV assembly 18 will enter the second or bypass mode of operation. Accordingly, the TMV assembly 18 will cause the seal 50 to move in a direction away from the spout 30 (i.e. against the pressure of the cold water in the bypass chamber 42, and thereby providing fluid communication between the mixing chamber 40 and the bypass chamber 42. The cold water in the bypass chamber 42 lowers the temperature of the water that exits the spout outlet 46. The TMV assembly 18 in "bypass" mode maintains the position of the seal 50 to modulate the flow of additional cold water from the bypass chamber 42 to the extent necessary to ensure that the predetermined temperature threshold is not exceeded. If the handles 22a, 22b are subsequently adjusted (or turned off) such that the temperature of the water in the mixing chamber 40 is consistently below the predetermined threshold, the TMV assembly 18 returns to the first mode and closes the sealing element 50 to remove the fluid connection between the bypass chamber 42 and both of the mixing chamber 40 and the spout outlet 46.

However, if the TMV assembly 18 is in the bypass mode, and the additional cold water from the bypass chamber 42 cannot cool the water to below the predetermined threshold, then the TMV assembly 18 enters the shut-down mode. In the shut-down mode, the TMV assembly 18 seals the spout outlet 46 from the water in the mixing chamber 40. The TMV assembly 18 transitions back from the shut-down mode to the bypass mode once the temperature of the water in the mixing chamber 40 falls below the predetermined threshold.

Figure 4B:
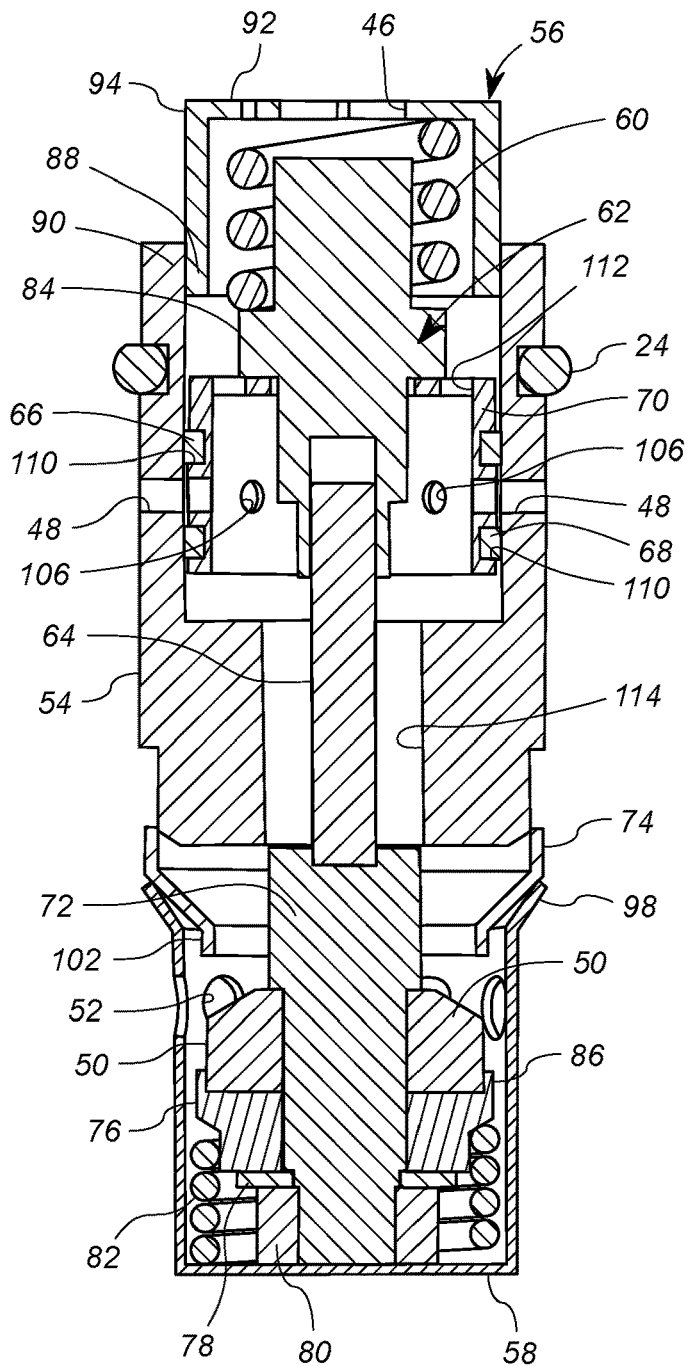
FIG. 4b shows a cutaway view of the TMV assembly of FIG. 4a wherein the TMV assembly is in the bypass mode.
Figure 4C:
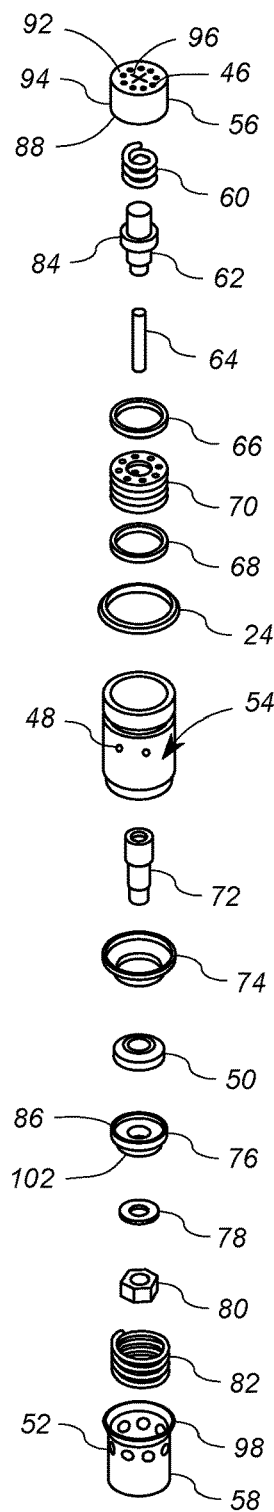

FIG. 4b shows a cutaway view of the TMV assembly 18 in the bypass mode, whereby fluid flows freely from the bypass inlet 52 to the spout outlet 46. FIG. 4c shows an exploded perspective view of the TMV assembly 18. With reference to FIGS. 4b and 4c, the TMV assembly 18 includes, from generally top to bottom, the cap 56, an upper spring 60, a thermal motor 62, a piston 64, O-ring seals 66, 68, a shut down barrel 70. the O-ring 24, the TMV body 54, a lower mandrel 72, a seating element 74, the sealing element 50, a lower seat retainer 76, a washer 78, a nut 80, a lower spring 82, and the lower housing 58.

The drive structures of the TMV assembly 18 are the thermal motor 62, the piston 64, and the lower mandrel 72. The thermal motor 62 may suitably be a thermal wax element or motor that expands, or in other words generates a linear force in the axially downward direction, responsive to heat. To this end, the thermal motor 62 contains wax that expands responsive to heat on the outer casing of the thermal motor, thus forming a form of temperature sensing element. The piston 64, which may suitably be a thin steel rod to handle the force of the thermal motor 62, is coupled to the thermal motor 62 to receive the expansive force and stroke axially downward responsive thereto. The distal end of the piston 64 is received by the lower mandrel 72. The lower mandrel 72 is a multi-radius shaft that is configured to retain, and translate axial movement to, the sealing element 50.

Assembled onto the lower mandrel 72 is the sealing element 50. The sealing element 50 may suitably be an EDPM rubber seal having a disk-like cylindrical body with a frustrum at the top to form the sealing surface. The mandrel 72 is configured to receive the seal 50 from the bottom (as shown in FIG. 4b). The seal 50 may be advanced axially upward on the lower mandrel 72 until reaching an upper limit defined by a wider radius of the mandrel 72. The seat retainer 76 is a brass structure configured to fit over the mandrel 72 below the sealing element 50 and to engage and receive the sealing element 50. To this end, the seat retainer 76 has an annular rim 86 having a diameter sufficient to seat the bottom of the sealing element 50. The washer 78 and nut 80 threadingly engage the bottom of the mandrel 72 and axially engage the seat retainer 76 to hold the seat retainer 76 and sealing element 50 at their uppermost extent on the mandrel 72.

Essentially the motor 62, piston 64 and lower mandrel 72 drive train is suspended between the upper spring 60 and the lower spring 82, within the housing formed by the cap 56, the body 54 and the lower housing 58. The upper spring 60 is a conventional spring that provides axial spring force between its two ends. In this embodiment, the upper spring 60 engages underside of the cap 56 on one end and the thermal motor 62 on the other end. The upper spring 60 also surrounds a part of the thermal motor 62 to help position the motor 62 along the axis of the cartridge 18. To this end, the upper spring 60 has an outer helical diameter that is less than a diameter the cap 56 and an inner helical diameter that is substantially equal to, but slightly greater than, the outer diameter of the portion of the thermal motor 62 that it surrounds. It will be appreciated that the thermal motor 62 further includes a wide annular shelf 84 in its axial midsection that provides the axial engaging surface for the spring 60.

Similarly, the lower spring 82 is similarly a conventional spring providing axial spring force between its two ends. In this embodiment, the lower spring 82 engages the inside of the lower housing 58 and, via the lower seat retainer 76, the lower mandrel 72. To this end, the lower spring 82 has an outer helical diameter that is less than a diameter of the lower housing 58 and an inner helical diameter that is substantially equal to, but slightly greater than, a portion of the lower seat retainer 76 that it surrounds. It will be appreciated that the lower seat retainer 76 has a varying diameter that includes a wider portion towards the top that provides an axial engagement surface for the lower spring 82.

With respect to the housing, the cap 56 is generally cylindrical and includes a top surface 92 and a cylindrical side 94. The top surface 92 includes holes that form the spout outlet 46, and slots 96 for receiving a screwdriver or other tool for rotation of the cap 56. The cylindrical side 92 further includes a threaded outer bottom area 88 that engages a corresponding threaded top area 90 of the body 54. The threading engagement of the cap 56 secures the cap 56 to the body 54 and retains the upper spring 60 within the housing.

The TMV body 54 is a generally cylindrical brass element having a diameter similar to the outer diameters of the hot water actuator 14 and cold water actuator 16, as discussed above, for ease of conformity of fixtures, manufacturing, and part replacement. The TMV body 54 includes the mixing chamber inlets 48 which consist of a plurality of holes disposed around the body 54 at the same axial level. The side of the body 54 includes an annular channel configured to receive the seal 24 at an axial level above the mixing chamber inlets 48. As will be discussed further below, the seal 24 forces all water that enters the spout 30 to pass through the interior of the TMV body 54.

Also disposed within the TMV body 54 and against a lower side of the shelf 84 of the motor 62 is the shutdown barrel 70. The shutdown barrel 70 is a device generally configured to selectively block the mixing chamber inlets 48. In particular, as will be discussed below in further detail, the TMV assembly 18 is configured to move the shutdown barrel 70 into an axial position in which the mixing chamber inlets 48 are blocked when the temperature of the water adjacent the motor 62 exceeds a predetermined threshold, and the thermal motor 62 is fully expanded to the maximum stroke. This is the shut-down mode of the TMV assembly 18.

To this end, the shutdown barrel 70 has a substantially cylindrical side 104 having a set of bores 106 arranged at the same axial level. The bores 106 are configured to generally align with the mixing chamber inlets 48 under normal mode or bypass mode conditions. The cylindrical side 104 also includes to annular channels 110 for receiving corresponding O-ring seals 66, 68. The shutdown barrel also includes a top surface 108 having a central opening for receiving the thermal motor 62 and outlets 112 that provide fluid communication between the interior of the shutdown barrel 70 and the spout outlet 46.

The lower housing 58 is a generally cylindrical cup-shaped structure with a flared upper rim 98. The flared upper rim 98 receives a frustroconical portion of the seating element 74, which in this embodiment is a Monel seal 74. The frustroconical portion of the Monel seal 74 receives the bottom of the body 54. The Monel seal 74 has a smaller bottom rim 102 that engages the sealing element 50 to provide the closing seal (in the first or normal mode) between the bypass inlet 52 and the spout outlet 46 (i.e. between the bypass inlet 52 and the interior of the TMV body 54.

The lower housing 58 is secured to the body 54 in this embodiment by being trapped between the wall 44 and the body 54. To this end, the flared upper rim 98 of the lower housing 58 (and the top rim of the Monel seal) is wider than the opening in the wall 44. As a result, the lower housing 58 can only travel downward until the flared upper rim 98 is prevented from further travel by the wall 44. When the retainer nut 20 (see FIGS. 1-3) is applied to secure the TMV assembly 18 in place, it places downward pressure on the body 54, which in turn pushes down on the Monel seal 74. The downward pressure on the Monel seal 74 and the positive interference between the wall 44 and the upper rim 98 cooperate to seal the opening in the wall 44, and to hold the lower housing 58 on the overall TMV assembly 50.

Referring again to FIG. 3 as well as FIG. 4b, the TMV assembly 18 is seated such that the lower housing 58 is disposed in the bypass chamber 42 (see also FIG. 3), and the interior of the lower housing 58 is in fluid communication with the bypass chamber 42 via the bypass inlet 52. The Monel seal 74 straddles the wall 44 between the mixing chamber 40 and the bypass chamber 42. The Monel seal 74 and/or flared rim 98 of the lower housing 58 seal the opening in the wall 44 such that the water in the bypass chamber 42 may only pass to the spout 30 and/or mixing chamber 40 via the interior of the TMV assembly 18 (or the cold water actuator 16).

The TMV body 54 is disposed in the mixing chamber 40, as shown in FIG. 3. The O-ring 24 seals the mixing chamber 40 from the spout 30 such that the only path of water from the mixing chamber 40 (or bypass chamber 42) is through the interior of the TMV body 54 and the cap 56.

Figure 5:
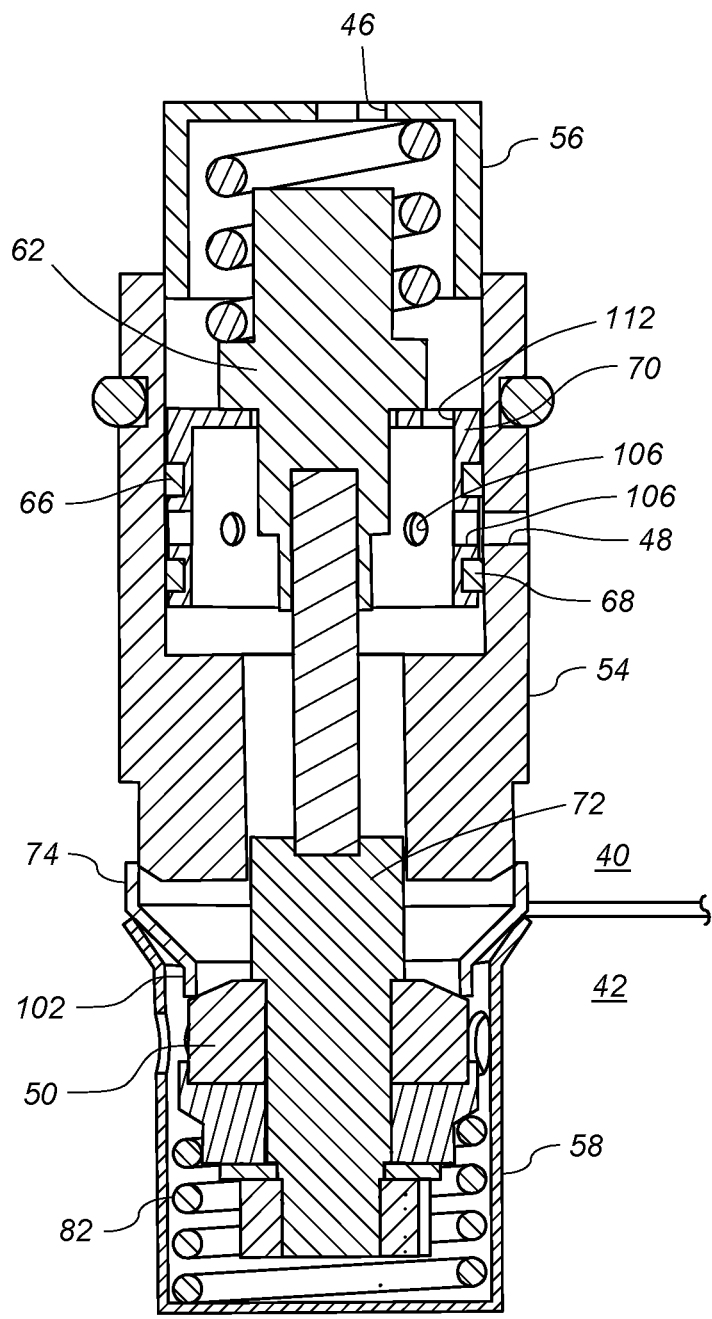
FIG. 5 shows another cutaway view of the TMV assembly of FIG. 4a wherein the TMV assembly is in the normal mode.

FIG. 5 shows a cross-sectional view of the TMV assembly 18 of FIGS. 4a, 4b and 4c in the normal mode of operation. In this mode, the sealing element 50 is biased against the bottom rim 102 of the Monel seal 74 by the lower spring 82. As such the bypass chamber 40 is not in fluid connection with the spout outlet 46, the interior of the TMV body 54, or the mixing chamber 40. In addition, the shutdown barrel 70 is disposed such that the bores 106 align with the mixing chamber inlets 48. It will be appreciated that the bores 106 need not align exactly with the inlets 48. Instead, the O-rings 66, 68 cooperate with the inner surface of the body 54 to create a sealed chamber that allows fluid to flow freely between the O-rings 66, 68, and hence from the inlets 48 to the bores 106.

As a result, as shown in FIG. 5, water under pressure in the mixing chamber 40 flows through the inlets 48, through the bores 106, out of the barrel outlets 112, and out of the spout outlet 46 into the spout 30. The water passes the walls of the thermal motor 62, which operate as a temperature sensor by translating the heat from the water to the internal wax element.

As discussed above, if the water in the mixing chamber 40 exceeds a predetermined threshold, the thermal motor 62 will expand, thereby pushing the piston 64 and hence the lower mandrel 72 axially downward against the bias of the lower spring 82. As a result, the sealing element 50 moves in a direction away from the spout 30 and therefore off of the Monel seal 74. When the sealing element 50 moves off of the Monel seal 74, the TMV assembly 18 is in the bypass mode, as shown in FIG. 4b, and fluid from the bypass chamber 42 can enter the body 54 (and the mixing chamber 40).

Referring to FIG. 4b, in the bypass mode, water from the bypass chamber 42 enters the bypass inlets 52, and flows past the sealing element 50 through the interior of the Monel seal 74, and then through a central bore 114 in the body 54 through which the mandrel 72 also travels. The water then passes into the interior of the shutdown barrel 70, where it can mix with the mixing chamber water that is received via the inlets 48 and bores 106. The mixture of the mixing chamber water and bypass chamber water in the interior of the shutdown barrel 70 then travels through the outlets 112, past the motor 62 and out of the spout outlet 46 to the spout 30.

The goal of mixing in the cold bypass water is to modulate the temperature of the water entering (and exiting) the spout 30 toward the predetermined maximum temperature. In this embodiment, the predetermined maximum temperature is 110 degrees Fahrenheit. The bypass mode operation is self-regulating. Thus, as more cold water is mixed in, the temperature of the water contacting the thermal motor 62 decreases, which in turn causes the thermal motor 62 to stop expanding, or even to retract. The final axial position of the piston 64 and lower mandrel 72 ideally define the amount of bypass water that is necessary to maintain the water at no more than the predetermined threshold temperature. Moreover, if the hot water actuator 14 is manipulated to shut off the hot water in the mixing chamber 40, then the temperature of the water contacting the thermal motor 62 reduces to below the predetermined maximum. The thermal motor 62 retracts, and the bias spring 82 once again forces the sealing element 50 against the lower rim 102 of the Monel seal 74. As a result, the TMV assembly 18 re-enters the normal mode.

Figure 6:
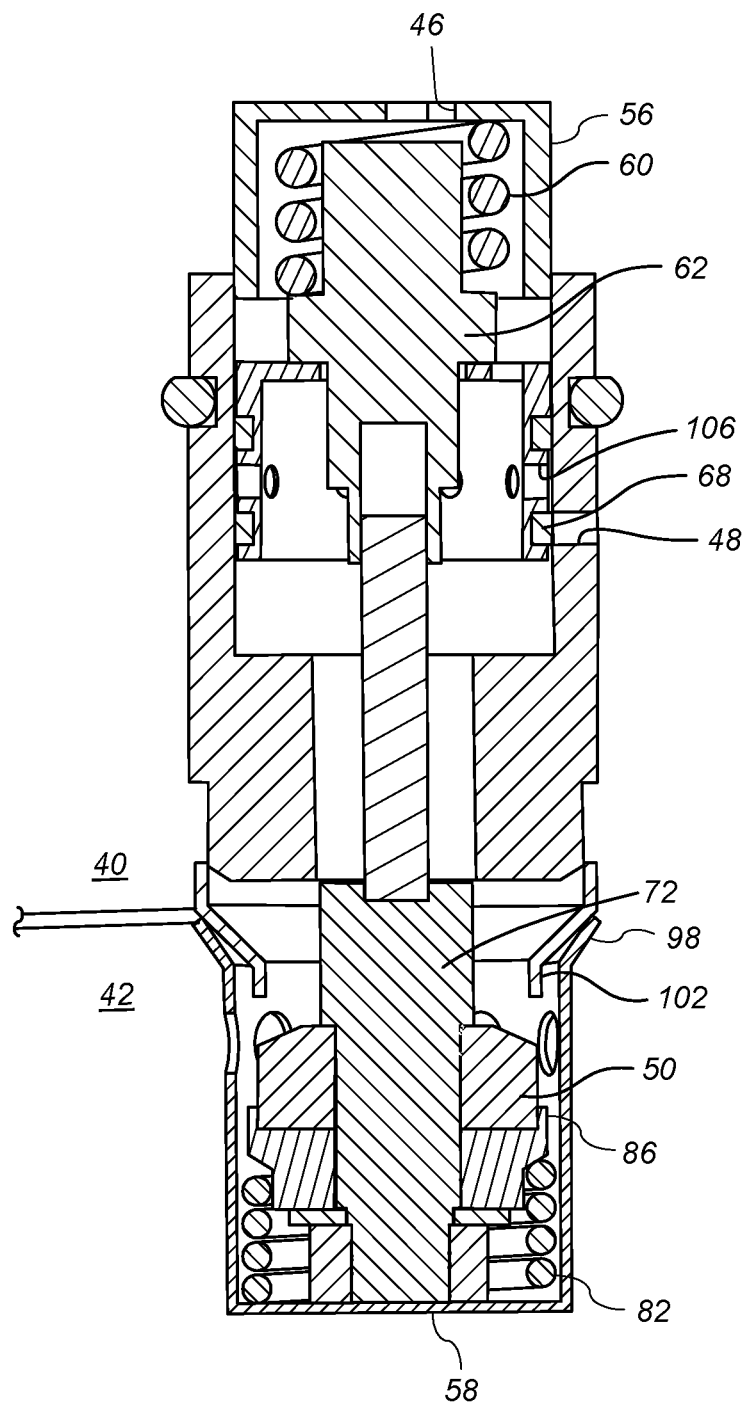
FIG. 6 shows a cutaway view of the TMV assembly of FIG. 4a wherein the TMV assembly is in the shutdown mode.

FIG. 6 shows a cross-section of the TMV assembly 18 in shutdown mode. The shutdown mode occurs when the add water from the bypass chamber 42 is insufficient to lower the water temperature to the predetermine maximum. In general, if the temperature of the water remains above the predetermined maximum, the thermal motor 62 continues to apply axial force downward on the piston 64 and hence the lower mandrel 72. The lower mandrel 72, however, eventually bottoms out, or in other words, is prevented from further axial movement by the lower housing 58. As a result, further axial expansion of the thermal motor 62 operates to force the thermal motor 62 upward against the force of the upper spring 60. After a sufficient upward travel of the thermal motor 62, the lower O-ring seal 68 aligns with (or past) the mixing chamber inlets 48, thereby sealing off the mixing chamber 40 from the interior of the shutdown barrel 70, and hence the spout outlet 46 and spout 30. It will be appreciated that in shutdown mode, water may still flow from the bypass chamber 42 in the same manner as the bypass mode.

It will be appreciated that the "predetermined temperature" of the TMV assembly 18 may be adjusted by rotating the cap 56. In particular, because the cap 56 and body 54 are coupled by corresponding helical threads, rotation of the cap 56 moves the cap axially upward or downward, depending on the direction of rotation. Axial movement of the cap 56 moves the upper spring 60 and hence the motor 62. It will be appreciated that moving the motor 62 downward reduces the temperature at which the bypass mode is entered because the less expansion of the thermal motor 62 is needed to move the sealing element 50 off of the Monel seal 74. Alternatively, moving the motor 62 upward increases the temperature at which the bypass mode is entered by additional expansion of the motor 62 is needed to move the seal off of the Monel seal 74.

Figure 7:
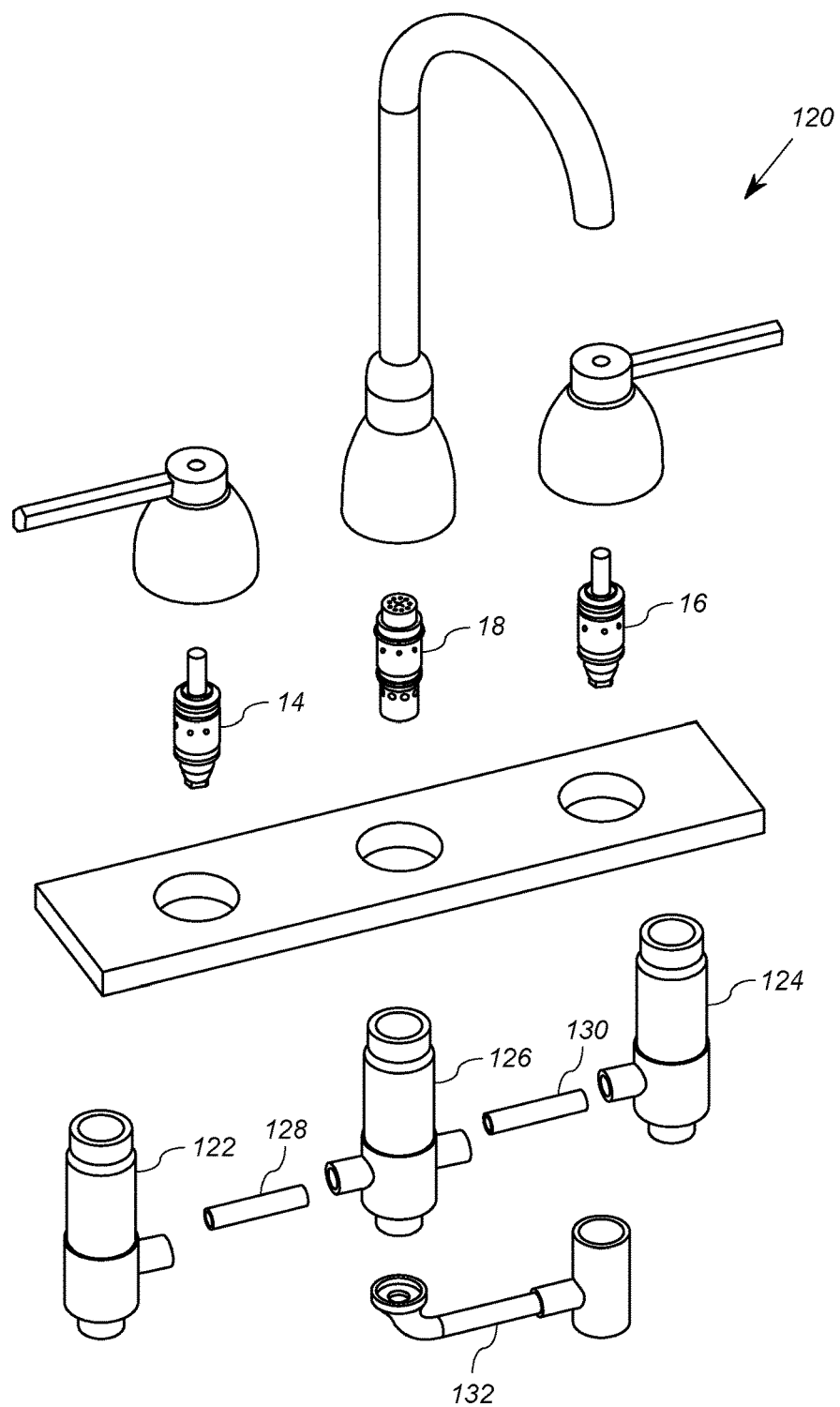
FIG. 7 shows an alternative faucet assembly in which the TMV assembly of FIG. 4a may be employed.

Thus, the TMV assembly 18 shown in FIGS. 4-6 has several features and advantages. It will be appreciated that the same TMV assembly 18 may be used in various faucets other than the faucet 10 of FIGS. 1-3. For example, FIG. 7 shows an alternative faucet 120 that does not have single faucet body in which the hot water actuator 14, the cold water actuator 16, and the TMV assembly 18 all attach. Instead, the faucet 120 of FIG. 7, each of the cartridges 14, 16 and 18 have individual housings 122, 124 and 126, coupled by conduits 128, 130, and 132. The housing 126 of the TMV assembly 18 operates as the mixing chamber, and the conduit 132 from the cold water inlet to the bottom of the housing 126 and the bottom of the housing 126 constitutes the bypass chamber.

Some of the features of the exemplary embodiment described herein include that it provides temperature protection in accordance with ASSE 1070 above the deck, and in such a way that the "normal mode" puts pressure on the sealing element 50 that cooperates with the sealing force of the lower spring 82. Another feature is that the mixing of water is down stream of the cartridges 14, 16. Among other things, this allows the TMV assembly 18 to be serviced (e.g. adjustment of the cap 56) in a way that is easily accessible by removing the spout 30.

Another embodiment of the invention does not include a lower housing or a Monel seal, but rather employs a similar sealing element 50 that forms a seal with the actual wall 44 between the bypass chamber 42 and the mixing chamber 40.

It will further be appreciated that at least some of the benefits of the present embodiment of invention may be provided in designs that do not employ a standard, uniform casing for the water cartridges and the TMV assembly 18. At least some of the advantages may be obtained even if the positions of the chambers are not vertically displaced, but nevertheless allow for a motor adjustment via the spout opening. Further, it will be appreciated that other modifications of the TMV assembly 18 may be used that retain the feature of opening the bypass seal by moving the seal away from the spout and/or mixing chamber, and further into the bypass chamber.

I claim:
1. A valve assembly for a faucet assembly, comprising:
 a housing including at least a first inlet configurable to receive water from a first source, a spout outlet in fluid connection with the first inlet, and a second inlet configurable to receive water from a second source;

a thermal motor disposed within the housing, the thermal motor configured to impart linear force in a first axial direction responsive to heat; and a seal operably coupled to the thermal motor to move in the first axial direction in response to the imparted linear force, the seal having a sealed position and at least one unsealed position, the seal in the sealed position forming a fluid seal between the second inlet and the spout outlet, wherein the sealed position is axially between the motor and the at least one unsealed position, and wherein movement of the seal in the first axial direction in response to the imparted linear force breaks the formed fluid seal to allow fluid flow within the housing from the second inlet to the spout outlet.

2. The valve assembly of claim 1, wherein:

the first inlet is part of a first set of inlets configured to receive water from the first source; and the second inlet is part of a second set of inlets configured to receive water from the second source.

3. The valve assembly of claim 1, further comprising a first spring disposed between the housing and the seal, the first spring configured to provide a bias force on the seal opposite the imparted linear force.

4. The valve assembly of claim 1, further comprising an axially moveable barrel having a third inlet, and wherein additional linear force imparted by the thermal motor moves the barrel from a first barrel position in which the first inlet and the third inlet are in fluid communication within the housing, to a second barrel position in which the first inlet and the third inlet are not in fluid communication within the housing.

5. The valve assembly of claim 4, further comprising a first spring disposed between the housing and the seal, the first spring configured to provide a bias force on the seal opposite the imparted linear force.

6. The valve assembly of claim 5, further comprising a second spring operably coupled to provide force between the housing and the thermal motor to urge the motor and the barrel in the first axial direction.

7. The valve assembly of claim 6, wherein the first spring and the second spring are configured such that the imparted linear force causes compression of the first spring before causing compression on the second spring.

8. The valve assembly of claim 1, wherein the thermal motor is a thermal wax motor.

9. A valve assembly, comprising:

a housing;

a thermal motor disposed within the housing, the thermal motor configured to impart linear force in an axial direction;

a seal operably coupled to the thermal motor to move in the axial direction in response to the imparted linear force, the seal having a sealed position and at least one unsealed position, the seal in the sealed position forming a fluid seal, wherein the sealed position is axially between the motor and the at least one unsealed position; and a shutdown barrel affixed to the thermal motor, the shutdown barrel configured to form a second seal sealing a first inlet in the housing in a first position, and allowing fluid communication through the first inlet in a second position.

10. The valve assembly of claim 9, further comprising a first spring disposed between the housing and the seal, the first spring configured to provide a bias force on the seal opposite the imparted linear force.

11. The valve assembly of claim 10, further comprising a second spring disposed between the housing and the motor, the second spring configured to provide a bias force between the motor and housing opposite the bias force provided by the first spring.

12. The valve assembly of claim 11, wherein the housing includes an adjustable cap, and wherein the second spring engages the adjustable cap, such that axial adjustment of the cap causes axial adjustment of at least a part of the second spring.

13. The valve assembly of claim 12, wherein the adjustable cap includes a spout outlet configurable to emit water received at the first inlet.

14. The valve assembly of claim 9, wherein the shutdown barrel includes an annular channel, and wherein the valve assembly further comprises a first O-ring seal disposed within the annular channel, the first O-ring seal configured to form the second seal.

15. A valve assembly for a faucet assembly, comprising:

a housing;

a thermal motor disposed within the housing, the thermal motor configured to impart linear force in a first axial direction;

a seal on a mandrel operably coupled to the thermal motor to move in the axial direction in response to the imparted linear force, the seal having a sealed position and at least one unsealed position, the seal in the sealed position forming a fluid seal, wherein the sealed position is disposed axially between the motor and the at least one unsealed position;

wherein the imparted linear force causes the mandrel to move in the first axial direction until the mandrel engages a stop, and wherein further imparted linear force after the mandrel engages a stop causes the thermal motor to move in a second axial direction.

16. The valve assembly of claim 15, wherein the movement of the seal in the first axial direction breaks the formed fluid seal.

17. The valve assembly of claim 16, wherein the movement of the thermal motor in the second axial direction causes a second seal to form within the housing.

18. The valve assembly of claim 17, further comprising a first spring disposed between a first end of the housing and the seal, the first spring configured to provide a bias force on the seal opposite the imparted linear force.

19. The valve assembly of claim 18, further comprising a second spring disposed between a second end of the housing and the motor, the second spring configured to provide a bias force between the motor and housing opposite the bias force provided by the first spring.

20. The valve assembly of claim 1, further comprising a rim disposed between the motor and the seal, and wherein the seal in the sealed position engages the rim to form a fluid seal between the second inlet and the spout outlet.

* * * * *